US012248162B2

(12) United States Patent
Orsila et al.

(10) Patent No.: US 12,248,162 B2
(45) Date of Patent: Mar. 11, 2025

(54) OPTICAL ASSEMBLY AND OPTICAL SYSTEM FOR BEAM STEERING AND HOMOGENIZATION

(71) Applicant: Modulight Corporation, Tampere (FI)

(72) Inventors: Lasse Orsila, Tampere (FI); Petteri Uusimaa, Tampere (FI)

(73) Assignee: Modulight Corporation, Tampere (FI)

( * ) Notice: Subject to any disclaimer, the term of this patent is extended or adjusted under 35 U.S.C. 154(b) by 349 days.

(21) Appl. No.: 17/846,707

(22) Filed: Jun. 22, 2022

(65) Prior Publication Data
US 2023/0417972 A1 Dec. 28, 2023

(51) Int. Cl.
| | |
|---|---|
| *F21V 8/00* | (2006.01) |
| *G02B 6/28* | (2006.01) |
| *G02B 26/10* | (2006.01) |
| *G02B 27/09* | (2006.01) |
| *G02B 27/48* | (2006.01) |

(52) U.S. Cl.
CPC ......... *G02B 6/0006* (2013.01); *G02B 6/2804* (2013.01); *G02B 26/10* (2013.01); *G02B 27/0922* (2013.01); *G02B 27/48* (2013.01)

(58) Field of Classification Search
CPC ...... G02B 6/0006; G02B 6/2804; G02B 6/10; G02B 27/0922; G02B 26/10; G02B 27/48
See application file for complete search history.

(56) References Cited

U.S. PATENT DOCUMENTS

| | | |
|---|---|---|
| 2013/0063706 A1 | 3/2013 | Kilcher et al. |
| 2018/0045976 A1 | 2/2018 | Lee et al. |
| 2018/0214238 A1 | 8/2018 | Santos et al. |

(Continued)

FOREIGN PATENT DOCUMENTS

| | | |
|---|---|---|
| EP | 2196844 A1 | 6/2010 |
| WO | 2015182025 A1 | 12/2015 |

OTHER PUBLICATIONS

European Patent Office, Notification of Transmittal of the International Search Report and the Written Opinion of the International Searching Authority, or the Declaration, Application No. PCT/FI2023/050321, Mailed Sep. 6, 2023, 16 pages.

*Primary Examiner* — Christopher E Dunay
(74) *Attorney, Agent, or Firm* — Ziegler IP Law Group, LLC.

(57) ABSTRACT

An optical assembly including light sources emitting light beams having multiple wavelengths; fiber combiner(s) arranged to combine light beams into combined beam, light beams enter fiber combiner(s); optical homogenizer(s), combined beam having non-homogenous intensity profile received at third end and combined beam having homogeneous intensity profile exits at fourth end; first optical element(s) second optical element(s), between optical homogenizer(s) and light guide(s), first optical element(s) and second optical(s) element collectively steer combined beam towards light guide(s), when optical assembly in use, second optical element(s) is adjustable to steer combined beam; first actuator(s) coupled to first optical element(s); controller coupled to first actuator(s), controller generate first signal controlling first actuator(s) that combined beam is steered by first optical element(s) also causing vibration of first optical element(s) at randomized pattern.

14 Claims, 4 Drawing Sheets

(56) References Cited

U.S. PATENT DOCUMENTS

| | | | |
|---|---|---|---|
| 2020/0333612 A1* | 10/2020 | Manassen | G02B 27/123 |
| 2021/0003854 A1* | 1/2021 | Bartlett | G03H 1/32 |
| 2024/0115120 A1* | 4/2024 | Halderman | A61B 1/04 |
| 2024/0241056 A1* | 7/2024 | Perillo | G02B 21/0076 |
| 2024/0245288 A1* | 7/2024 | Shen | A61B 1/05 |

* cited by examiner

OPTICAL ASSEMBLY AND OPTICAL SYSTEM FOR BEAM STEERING AND HOMOGENIZATION

TECHNICAL FIELD

The present disclosure relates to optical assemblies for medical applications. The present disclosure also relates to optical systems for medical applications.

BACKGROUND

Medical applications may sometimes require illuminating (and additionally, imaging) of an interior of a body for clinical analysis and medical intervention. Such illuminating can be performed for viewing or visually representing functions of organs, tissues, cells, and the like in the body. Examples of medical applications involving such illuminating could be, an optical imaging technique, a Magnetic Resonance Imaging (MRI) technique, an X-ray technique, a Computed Tomography (CT) technique, and the like. Typically, optical illumination is most widely used as it is a minimally-invasive or non-invasive medical illumination technique for viewing (and optionally, imaging) the interior of the body. The optical illumination utilizes beam(s) of light to obtain a detailed view (and optionally, an image) of a target (for example, such as an organ, a tissue, a cell, or similar). Examples of optical illumination techniques may include, but are not limited to, Optical Coherence Tomography (OCT), Photoacoustic Imaging, Raman Spectroscopy, Optical microscopy, Endoscopy, and the like.

However, existing equipment and techniques for optical illumination have several problems associated therewith. Firstly, the existing equipment and techniques produces with light with considerable amount of speckle, i.e., a random granular pattern of the light. This is because when the target is illuminated using a white light source and a fluorescence excitation laser light source, owing to a coherent nature of light emitting from said light sources, the light undergoes constructive and destructive interferences. This results in producing the light with speckles on a viewing plane (for example, a screen or a flat surface). Such speckles appear as a dotted pattern of the light representing undesirable intensity variation of the light, which changes rapidly even with a slightest movement of the viewing plane. This creates a flickering of light which is highly undesirable to an observer (for example, a surgeon). Furthermore, formation of such speckles is also undesirable in image display systems (such as projectors, rear-projection televisions, near-to-eye displays, head-mounted displays, head-up displays, and the like) and in optical imaging systems (such as Raman, confocal microscopes, fluorescence microscopes, endoscopes, and the like). Moreover, some existing optical systems may, for example, employ ordered or random microlens arrays, diffractive optical elements, optical integrator, and the like, for reducing the speckles. However, the aforesaid ways perform well only with incoherent light sources or low coherence lasers (such as excimer lasers), but not with coherent light sources. Furthermore, some existing equipment and techniques employ mechanically moving/vibrating elements for reducing the speckles. However, such parts are prone to failure or wear, and thus are difficult to implement.

Secondly, the existing equipment and techniques produce non-homogeneous light on the viewing plane. As a result, there is obtained a suboptimal (i.e., low) image quality (for example, in terms of resolution, exposure and contrast) of a view (or an image) of the target, which may significantly degrade quality and usability of the image. For example, the view (or the image) of the target may be over-exposed in regions where intensity of non-homogenous light is high and may be under-exposed in other regions where intensity of non-homogenous light is low. Moreover, when coherent light sources are used for illuminating the target, considerable amount of speckle is produced due to such non homogeneity, and optical losses are observed.

Therefore, in light of the foregoing discussion, there exists a need to overcome the aforementioned drawbacks associated with the existing equipment and techniques for optical illumination for medical applications.

SUMMARY

The present disclosure seeks to provide an optical assembly for medical applications. The present disclosure also seeks to provide an optical system for medical applications. An aim of the present disclosure is to provide a solution that overcomes at least partially the problems encountered in prior art.

In a first aspect, an embodiment of the present disclosure provides an optical assembly comprising:
- a plurality of light sources that, in operation, emit a plurality of light beams, the plurality of light beams having a plurality of wavelengths;
- at least one fiber combiner arranged on an optical path of the plurality of light beams to combine the plurality of light beams into a combined beam, the at least one fiber combiner having a first end and a second end, wherein the plurality of light beams enter the at least one fiber combiner at the first end and the combined beam exits the at least one fiber combiner at the second end;
- at least one optical homogenizer for producing a homogenous intensity profile of the combined beam, the at least one optical homogenizer having a third end and a fourth end, wherein the combined beam having a non-homogenous intensity profile is received from the at least one fiber combiner at the third end and the combined beam having the homogeneous intensity profile exits the at least one optical homogenizer at the fourth end;
- at least one first optical element and at least one second optical element arranged on an optical path of the combined beam, between the at least one optical homogenizer and at least one light guide, wherein the at least one first optical element and the at least one second optical element collectively steer the combined beam towards the at least one light guide, and wherein when the optical assembly is in use, the at least one second optical element is adjustable to steer the combined beam;
- at least one first actuator coupled to the at least one first optical element; and
- a controller communicably coupled to the at least one first actuator, the controller being configured to generate a first signal for controlling the at least one first actuator to adjust the at least one first optical element in a manner that the combined beam is steered by the at least one first optical element whilst also causing vibration of the at least one first optical element at a randomized frequency pattern.

In a second aspect, an embodiment of the present disclosure provides an optical system comprising:
- at least one optical assembly according to the first aspect;

at least one viewing device configured to at least view a target; and at least one light guide having a fifth end and a sixth end, the at least one light guide being arranged on an optical path of at least one combined light beam exiting the at least one optical assembly and the target, wherein the fifth end receives the combined beam from the at least one optical assembly and the combined beam exits from the sixth end to illuminate the target for enabling at least viewing of the target.

Embodiments of the present disclosure substantially eliminate or at least partially address the aforementioned problems in the prior art, and enable generation of speckle-free, coherent, and homogeneous combined beam for illuminating a target.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an optical assembly comprising:

a plurality of light sources that, in operation, emit a plurality of light beams, the plurality of light beams having a plurality of wavelengths;

at least one fiber combiner arranged on an optical path of the plurality of light beams to combine the plurality of light beams into a combined beam, the at least one fiber combiner having a first end and a second end, wherein the plurality of light beams enter the at least one fiber combiner at the first end and the combined beam exits the at least one fiber combiner at the second end;

at least one optical homogenizer for producing a homogenous intensity profile of the combined beam, the at least one optical homogenizer having a third end and a fourth end, wherein the combined beam having a non-homogenous intensity profile is received from the at least one fiber combiner at the third end and the combined beam having the homogeneous intensity profile exits the at least one optical homogenizer at the fourth end;

at least one first optical element and at least one second optical element arranged on an optical path of the combined beam, between the at least one optical homogenizer and at least one light guide, wherein the at least one first optical element and the at least one second optical element collectively steer the combined beam towards the at least one light guide, and wherein when the optical assembly is in use, the at least one second optical element is adjustable to steer the combined beam;

at least one first actuator coupled to the at least one first optical element; and a controller communicably coupled to the at least one first actuator, the controller being configured to generate a first signal for controlling the at least one first actuator to adjust the at least one first optical element in a manner that the combined beam is steered by the at least one first optical element whilst also causing vibration of the at least one first optical element at a randomized pattern.

In a second aspect, an embodiment of the present disclosure provides an optical system comprising:

at least one optical assembly according to the first aspect;

at least one viewing device configured to at least view a target; and at least one light guide having a fifth end and a sixth end, the at least one light guide being arranged on an optical path of at least one combined light beam exiting the at least one optical assembly and the target, wherein the fifth end receives the combined beam from the at least one optical assembly and the combined beam exits from the sixth end to illuminate the target for enabling at least viewing of the target.

The optical assembly of the present disclosure generates a homogeneous intensity profile of the plurality of light beams. Herein, the at least one optical homogenizer of the optical assembly is used to produce nearly constant optical intensity of the plurality of light beams coming from the plurality of light sources. The constant optical intensity of the plurality of light beams is a crucial factor in imaging for obtaining a high intensity image of a target. The at least one optical homogenizer provide homogeneity to the plurality of light beams without any significant optical loss. Further, the at least one optical homogenizer is supplemented with the at least one first optical element and the at least one second optical element that work in synchronization with each other to minimize visibility of speckle patterns during illumination of the target using the plurality of light beams. The at least one first optical element undergoes actuation (i.e., vibration at the randomized pattern) to significantly reduce an amount of speckle in the image formed using the plurality of light beams. As an example, the at least one first optical element may reduce the amount of speckle up to approximately 25%. The Speckle is manifest as bright and dark granular and/or dotted light patterns unrelated to the image content, which changes rapidly with a slightest movement of a surface or a waveguide. This creates a flickering appearance which is unpleasant to eyes, reduces resolution, contrast, and usability of the image. The optical assembly of the present disclosure can address various issues encountered during imaging of a target, such as appearance of speckle patterns in an image, non-uniformity of the plurality of light beams, and the like which can significantly reduce the quality of the image.

The plurality of light sources, in operation, emit the plurality of light beams having the plurality of wavelengths. Optionally, different light sources emit light beams of different wavelengths. The plurality of light sources could be small portable light sources and/or large standalone light sources. A number of light sources in the plurality of light sources may depend upon an intensity of light required for illuminating the target.

In this regard, a number of light sources required for high-intensity illumination of the target may be higher than a number of light sources required for low-intensity illumination of the target. Optionally, the number of light sources in the plurality of light sources lies in range of 1-20. As an example, 3 light sources may be employed in the optical assembly. Notably, wavelengths of the plurality of light beams emitting from the plurality of light sources depend upon type of the plurality of light sources. Optionally, the wavelengths of the plurality of light beams lie in a range of 200 nanometres (nm) to 800 nanometres (nm). For example, the wavelengths lie in a range of 200 nm, 250 nm, 300 nm, 400 nm, 500 nm or 650 nm up to 350 nm, 500 nm, 600 nm, 650 nm, or 700 nm, 750 nm or 800 nm. Optionally, the wavelengths of the plurality of light beams lie in a range of 200 nm to 1000 micrometres ($\mu m$). For example, the wavelengths lie in a range of 200 nm, 1 $\mu m$, 2 $\mu m$, 6 $\mu m$, 10 $\mu m$, 20 $\mu m$, 40 $\mu m$, 120 $\mu m$, 200 $\mu m$, 400 $\mu m$, 600 $\mu m$, or 800 $\mu m$ up to 300 $\mu m$, 500 $\mu m$, 650 $\mu m$, 800 $\mu m$, 900 $\mu m$, or 1000 $\mu m$.

The plurality of light sources could be coherent light sources and/or non-coherent light sources. In an embodiment, the plurality of light sources are implemented as at least one light source that produces white light, wherein the at least one light source that produces the white light is implemented as at least one of: a white light laser, a Red-Green-Blue (RGB) laser, a white light light-emitting diode (LED), a set of RGB LEDs, a halogen lamp. In this way, the plurality of light sources emit only the white light. As an example, the plurality of light sources could be a combination of the white light laser and the RGB laser.

In another embodiment, the plurality of light sources are implemented as at least one light source that produces white light and at least one laser light source that produces fluorescence excitation light, wherein the at least one light source that produces the white light is implemented as at least one of: a white light laser, a Red-Green-Blue (RGB) laser, a white light light-emitting diode (LED), a set of RGB LEDs, a halogen lamp. In this way, the plurality of light sources emit a combination of the white light and the fluorescence excitation light. The term "laser light source" refers to an electromagnetic radiation emitting device using light amplification by stimulated emission of radiation. Wavelengths of the light beams for medical and/or commercial applications consists of ultraviolet, visible, and infrared regions of the spectrum. Advantageously, the laser light sources generate the fluorescence excitation light to facilitate fluorescence-assisted medical imaging of the target. Optionally, the wavelength of the fluorescence excitation light lies in a range of 10 nm-1 mm. For example, the wavelength may be in range of 10 nm, 100 nm, 500 nm, 1 $\mu m$, 5 $\mu m$, 25 $\mu m$, 50 $\mu m$, 0.1 mm, 0.2 mm, 0.4 mm, or 0.6 mm up to, 0.3 mm, 0.35 mm, 0.4 mm, 0.5 mm, 0.6 mm, 0.7 mm, 0.85 mm, or 1 mm. Alternatively, the fluorescence excitation light may be produced by a light-emitting diode (LED), a mercury arc lamp, a xenon arc lamp, a tungsten-halogen lamp, or the like. As an example, the plurality of light sources could be a combination of the white light laser, the RGB laser, and the at least one laser light source that produces the fluorescence excitation light. The technical advantage of having different types of the light sources is that the light sources are easy to procure and use, and are inexpensive. Furthermore, the quality of the image produced by illuminating the target is significantly enhanced by using a required type of light source.

The at least one fiber combiner is arranged on the optical path of the plurality of light beams emitted from the plurality of light sources. The at least one fiber combiner is used to combine the plurality of light beams emitted from the plurality of light sources to form the combined beam. The plurality of light beams enters the at least one fiber combiner at the first end and exit as the combined beam from the second end.

Optionally, the at least one optical fiber combiner comprises:
   a combining element;
   a plurality of input fibers that are optically coupled to outputs of the plurality of light sources and an input of the combining element; and
   an output fiber optically coupled to an output of the combining element and to the at least one optical homogenizer.

In this regard, the plurality of input fibers may be implemented as one of: at least one multi-mode optical fibre, a plurality of single-mode optical fibers. A given fiber comprises a core surrounded by a cladding. A diameter of the core of the plurality of single-mode optical fibers is less than the diameter of the core of the at least one multi-mode optical fiber. Optionally, a diameter of a core of the plurality of single-mode optical fibers lies in a range of 3 $\mu m$-9 $\mu m$. Optionally, a diameter of the at least one multi-mode optical fiber lies in a range of 50 $\mu m$-80 $\mu m$. The plurality of light beams emitted from the outputs of the plurality of light sources are propagated through the plurality of input fibers towards the combining element. The plurality of input fibers are immune (or less prone) to a problem of electromagnetic interference, and thus the plurality of light beams are transmitted efficiently therethrough. The term "combining element" herein referred to as an optical component used as a support preform to combine the plurality of light beams into the combined beam. The combining element optionally has a plurality of capillary bores. The plurality of input fibers are inserted inside the plurality of capillary bores. The combining element and the plurality of input fibers are optionally fused together to combine the plurality of light beams into the combined beam. The combined beam is propagated towards the at least one optical homogenizer via the output fiber. Optionally, the output fiber is implemented as the multi-mode optical fiber. Advantageously, the technical effect of using the at least one fiber combiner is that an output power and radiance of the plurality of light beams is multiplied while preserving quality of the plurality of light beams, when forming the combined beam.

The term "optical homogenizer" refers to an optical component that makes an intensity profile of a light beam uniform. The combined beam received at the third end of the at least one optical homogenizer may have the non-homogenous intensity profile. The non-homogeneous profile relates to a non-uniform intensity distribution of the combined beam. The combined beam is homogenized by disposing the at least one optical homogenizer on the optical path of the combined beam. The at least one homogenizer is used to modify an intensity profile of the combined beam in a way to obtain a nearly constant (i.e., uniform) optical intensity over a given area (i.e., a cross-sectional area of the fourth end of the at least one optical homogenizer). In other words, an intensity distribution of the combined beam over the given area is homogenous. Such a homogeneous distribution of the intensity of the combined beam results in uniform illumination of the target.

Optionally, the at least one optical homogenizer is implemented as at least one of: a non-circular waveguide, a diffuser, a mirror, a lens, a diffractive element, an aperture. In one implementation, the non-circular waveguide is used as the at least one optical homogenizer. Optionally, the non-circular waveguide is a hollow structure having a uniform cross-section at the fourth end, wherein the cross section at the fourth end is non-circular in shape. The combined beam enters the waveguide at the third end and is propagated through the non-circular waveguide whilst undergoing successive reflections from inner walls of the hollow structure. The successive reflections of the combined beam results in homogenization of the combined beam. Optionally, at the fourth end of the non-circular waveguide, a homogeneous plane is formed (by a cross-section of the fourth end) whereat the intensity of the combined beam is homogenized. Optionally, an area of the homogeneous plane is equal to an area of the fourth end of the non-circular waveguide. The fourth end may have a predefined area depending upon a required intensity of combined beam the fourth end. The non-circular waveguide is named so because at least the cross-section of the fourth end has a non-circular shape. The non-circular waveguide may be provided in different shapes depending upon its application. Examples of the non-circular waveguide could be, but are not limited to, a square waveguide, a rectangular waveguide. As an example, the square waveguide having an area of 360 square millimetres (i.e., dimensions of 600 μm*600 μm) may be used as the at least one optical homogenizer. The non-circular waveguide is used as it offers less radiation loss during transmission of the combined beam through it as compared to a circular waveguide. The technical benefit of using the at least one optical homogenizer is that the homogeneous intensity profile of the combined beam exits from the fourth end while suppressing radiation loss of the combined beam as much as possible.

Optionally, the optical assembly further comprises at least one collimator arranged on the optical path of the combined beam between the at least one optical homogenizer and a given optical element, wherein the at least one collimator collimates the combined beam. Optionally, the at least one given optical element is one of: the at least one first optical element, the at least one second optical element. The combined beam having the homogeneous intensity profile exits the fourth end and is optionally directed towards the at least one collimator. The at least one collimator narrows constituent light beams of the combined beam to collimate the combined beam. The combined beam that is collimated then moves further along its optical path. The at least one collimator is implemented as at least one of: a lens, a curved mirror. Advantageously, the at least one collimator ensures that the combined beam propagates along its optical path without its constituent light beams getting dispersed in unwanted directions. It will be appreciated that it may be possible that the combined light beam exiting from the at least one optical homogenizer is already collimated and thus does not require collimation. In such cases the optical assembly does not include the at least one collimator. It may also be possible that collimation (i.e., beam shaping or beam narrowing) is performed by the given optical element (for example, by the at least one first optical element).

Optionally, the optical assembly further comprises at least one focusing element arranged on the optical path of the combined beam between the at least one optical homogenizer and a given optical element, wherein the at least one focusing element matches a width of the combined beam with a diameter of a fifth end of the at least one light guide, the fifth end being arranged to receive the combined beam. Optionally, in this regard, the given element is one of: the at least one first optical element, the at least one second optical element. The at least one focusing element receives the combined beam and directs it towards the at least one first optical element or at least one second optical element, whilst focusing the combined beam to have a required width. The at least one focusing element can be understood to be "focusing optics" of the optical assembly since it provides a light-focusing effect for adjusting the width of the combined beam as required. The at least one focusing element may be implemented as at least one of: a lens, a mirror. Advantageously, the technical effect of using the at least one focusing element is that the width of the combined beam, upon reflection from and/or passage through the at least one focusing element, is equal to the diameter of the fifth end of the at least one light guide, which in turn helps in minimizing optical losses and enhancing an illumination profile of the target. It will be appreciated that it may be possible that the combined light beam exiting from the at least one optical homogenizer is already focused and thus does not require focusing. In such cases, the optical assembly does not include the at least one focusing element.

As one example, the optical assembly may comprise both the at least one collimator and the at least one focusing optics. Optionally, the at least one collimator is arranged between the at least one optical homogenizer and the at least one focusing element, while the at least one focusing element is arranged between the at least one collimator and the given optical element. Alternatively, optionally, the at least one focusing element is arranged between the at least one optical homogenizer and the at least one collimator, while the at least one collimator is arranged between the at least one focusing element and the given optical element.

The term "optical element" refers to an optical component used for free-space beam steering and positioning in the optical assembly. Furthermore, the at least one first optical element provides an added functionality of speckle reduction. The at least one first optical element and the at least one second optical element are disposed between the at least one optical homogenizer and the at least one light guide. Optionally, the at least one first optical element and the at least one second optical element are disposed between the at least one focusing element and the at least one light guide. Alternatively, optionally, the at least one first optical element and the at least one second optical element are disposed between the at least one collimator and the at least one light guide. The at least one first optical element and the at least one second optical element collectively steer the combined beam towards the at least one light guide. The at least one second optical element is adjusted by at least one of: a manual operation, an actuator. The at least one first optical element and the at least one second optical element provides a quasi-random movement to the combined beam in order to form multiple surface deformations over a time. The randomness of reflectivity of the combined beam leads to superimposing a sequence of speckle patterns, therefore the speckle become nearly undetectable with at least one viewing device or eyes.

Optionally, in the optical assembly,
the at least one first optical element is arranged between the at least one second optical element and the at least one light guide; or
the at least one second optical element is arranged between the at least one first optical element and the at least one light guide.

In this regard, it will be appreciated that in the optical assembly, positions of the at least one first optical element and the at least one second optical element can be interchanged. In one implementation, the at least one first optical element may be placed between the at least one second optical element and the at least one light guide. In said implementation, the at least one first optical element received the combined beam from the at least one second optical element, is vibrated at the randomized pattern to remove speckle, and directs the combined beam towards the at least one light guide. In another implementation, the at least one second optical element is placed between the at least one first optical element and the at least one guide. In said implementation, the at least one first optical element is vibrated at the randomized pattern to remove speckle and steers the combined beam towards the at least one second optical element. Then, the at least one second optical element directs the combined beam towards the at least one light guide.

Optionally, a given optical element is implemented as at least one of: a mirror, a lens, a waveguide. In this regard, the given optical element could be the at least one first optical element and/or the at least one second optical element. In an example, the at least one first optical element and the at least one second optical element may be implemented as a first mirror and a second mirror, respectively. In another example, the at least one first optical element may be implemented by two mirrors whereas the at least one second optical element may be implemented as the waveguide. The technical advantage of this is that the given optical element is easy to procure and use, in the optical assembly.

Further, the at least one first optical element is coupled with the at least one first actuator. Herein, the term "actuator" refers to an equipment that is employed to displace, rotate, tilt, shift and/or change a shape of a component with which it is associated. A given actuator may, for example, include electrical components, mechanical components, magnetic components, polymeric components and so forth. The given actuator is driven by the drive signal, which could be a piezoelectric force, an electromagnetic force, a mechanical torque, an electric current, a hydraulic pressure, a pneumatic pressure or similar. Examples of the at least one first actuator could be, but are not limited to, an electrostatic actuator, a piezoelectric actuator, a mechanical actuator and the like.

The at least one first actuator is controlled by the controller. The term "controller" refers to hardware, software, firmware, or a combination of these, that controls operation of controllable components of the optical assembly. The controller is communicably coupled to the at least one first actuator. For example, the controller is communicably coupled to the at least one first actuator via a communication network. It will be appreciated that the communication network may be wired, wireless, or a combination thereof. The communication network could be an individual network or a combination of multiple networks. Examples of the communication network may include, but are not limited to one or more of, Internet, a local network (such as, a TCP/IP-based network, an Ethernet-based local area network, an Ethernet-based personal area network, a Wi-Fi network, and the like), a telecommunication network, and a short-range radio network (such as Bluetooth©). The controller is configured to generate the first signal to activate the at least one first actuator for adjusting the at least one first optical element. The at least one first optical element steers the combined beam towards the at least one light guide whilst also undergoing vibrations (at the randomized pattern) generated by the at least one first actuator.

Optionally, frequencies in the randomized pattern vary in a range of 100 Hz to 1000 MHz. The at least one first optical element is vibrated according to the randomized pattern such that the vibration of the at least one first optical element randomizes phase difference between the plurality of light beams constituting the combined beam, which are steered by the at least one second optical element. The range of frequencies (i.e., a set of random frequencies in the randomized pattern) depends upon the at least one first actuator. As an example, when the at least one first actuator is implemented as the piezoelectric actuator, the randomized frequencies may lie in a range of 100 Hz to 1000 MHz. The technical advantage of vibrating the at least one first optical element is that such vibration results in a quasi-random movement being imparted to the constituent light beams of the combined beam which forms a plurality of surface deformations over a time. The quasi-randomness of the constituent light beams of the combined beam results in superimposition of a sequence of speckle patterns upon each other when the combined beam is received by the at least one light guide upon steering, thus masking presence of the speckle. As an example, the at least one optical element may be vibrated at a frequency above 1000 Hz, resulting in masking the presence of the speckle to an eye.

Optionally, the optical assembly further comprises at least one second actuator coupled to the at least one second optical element, wherein the controller is communicably coupled to the at least one second actuator, the controller being configured to generate a second signal for controlling the at least one second actuator to adjust the at least one second optical element in a manner that the combined beam is steered by the at least one second optical element. The controller is communicably coupled to the at least one second actuator via the communication network. The controller is configured to generate the second signal to activate the at least one second actuator for steering the combined beam. The at least one second actuator functions by adjusting the at least one second optical element in a required manner. The at least one second actuator is optionally implemented as a part of: an ultrasonic motor, an electric motor. In an embodiment, adjustment of the at least one second optical element encompasses moving the at least one second optical element to cause steering of the combined beam towards the at least one first optical element. The movement of the at least one second optical element includes displacement, tilting, rotation, shape changing, and the like. As an example, the at least one second optical element (implemented, for example, as a mirror) may reflect the combined beam towards the at least one first optical element. The technical benefit of the at least one second actuator is that the combined beam is efficiently steered towards the at least one first optical element without any optical loss.

Optionally, the optical assembly further comprises at least two mounts to hold the at least one first optical element and the at least one second optical element, wherein the at least two mounts are spring loaded. The at least two mounts are implemented as one of: a gimble mount, platform mount, a flexure mount, a low wavefront distortion (LWD) mount, and the like. The at least two mounts are controllable to arrange the at least one first optical element and the at least one second optical element in a required position and/or an orientation. Optionally, the at least two mounts comprise at least one first mount and at least one second mount which are actuated by the at least one first actuator and the at least one second actuator, respectively, to enable adjustment of the at least one first optical element and the at least one second optical element as discussed above. Advantageously, the technical effect of using the at least two mounts is that the position and/or the orientation of the at least one first optical element and the at least one second optical element can be set efficiently and precisely so as to steer the combined beam effectively towards the at least one light guide without significant optical loss.

The present disclosure also relates to the optical system as described above. Various embodiments and variants disclosed above, with respect to the aforementioned first aspect, apply mutatis mutandis to the optical system.

In the optical system, the at least one viewing device is configured to at least view the target. The at least one viewing device could be at least one of a microscope, a magnifying glass, a camera, a tomograph, and the like. The term "viewing device" also encompasses an eye of a person.

When the combined beam exiting the at least one optical assembly is directed at the target by the at least one light guide, the target is illuminated by the combined beam, and is viewable by the at least one viewing device. Optionally, the at least one viewing device is configured to also capture at least one image of the target. As an example, the at least one viewing device may be at least one camera that is capable of capturing the at least one image of the target. The at least one camera may be at least one of a grayscale camera, a monochrome camera, a Red-Green-Blue (RGB) camera, an RGB-Depth (RGB-D) camera, or similar. Optionally, the at least one camera can be implemented as at least one of: a visible light camera, a multispectral camera, a hyperspectral camera.

The term "light guide" refers to an optical component used to guide (i.e., transmit in a required manner) the combined beam from the at least one optical assembly towards the target. For example, the at least one light guide may guide the combined beam through itself, from the fifth end to the sixth end, by way of enabling successive internal reflection of the combined beam within the at least one light guide. The at least one light guide could be made of a thin filament of a transparent material.

Examples of the transparent material could be, but are not limited to, plastic, glass, and acrylic. The transparent material used to make the at least one light guide may be flexible, inflexible, or a combination of both (i.e., it has both flexible and inflexible portions). The at least one light guide is arranged on the optical path of the combined beam between the optical assembly and the target.

Optionally, the at least one light guide is implemented as at least one of: a fiber optic light guide, a liquid light guide. Optionally, the at least one light guide comprises a large core multimode fiber or a plurality of small core fibres bundled together (i.e., bundled fibres). In case of the bundled fibres, the plurality of fibres are arranged in a random manner which imparts additional intensity homogeneity to the combined beam. Liquid light guides typically have a flexible outer sheath and a light-conducting liquid core. In different implementations of the optical system, the at least one light guide is used to transmit the combined beam for varying applications. In some implementations, the at least one light guide is implemented as the fiber optic light guide. In said implementations, the combined beam can be transmitted to illuminate the target for microscopy applications, endoscopy applications, or similar, using the fiber optic light guide. In other implementations, the at least one light guide is implemented as the liquid light guide. In said implementations, the combined beam is utilized to illuminate the target for fluoroscopy applications. Advantageously, the technical benefit of using different types of the at least one light guide is that the combined beam can be efficiently propagated without any optical loss to illuminate the target, where the plurality of light sources cannot be directly used for the same.

The target is illuminated by the combined beam and the image of the target is at least viewed, and may additionally be captured, by the at least one viewing device. Optionally, the target is at least one of: a biomedical sample, a body part, and wherein the optical system is employed for at least one of: fluorescence microscopy, endoscopy, wide field imaging, advanced optical coherence tomography (OCT), fluorescence molecular tomography (FMT), fluorescence guided surgery, flow cytometry, sequencing, optical biopsy. Optionally, the body part could be a tissue, an organ, or the like. Alternatively, optionally, the body part could be cells. In this regard, the optical system of the present invention is utilized in viewing (and optionally, optical imaging) of various body parts in a patient. In one implementation, the fluorescence microscopy is performed on the target by utilizing the combined beam coming from the at least one optical assembly to illuminate the target, and a fluorescence microscope is used to view the target. The fluorescence microscope may be used to study properties of the target in a microplate reader. The target could be an organic compound, an inorganic compound, or the like. In another implementation, the endoscopy is performed to look inside a body of a patient. As an example, an endoscope may be employed by a medical professional to examine body parts of the patient. Examples of the body part could be, but are not limited to, an oesophagus, a stomach, a colon, a nose, a heart, and a urinary tract, of the patient. Advantageously, the technical benefit of using the optical system is that the view of the target (and optionally, at least one image of the target) produced by using aforesaid optical system is free of speckle. When the at least one image of the target is captured, the at least one image has a high quality as it is free from speckle.

Optionally, the optical system further comprises at least one light port to which the sixth end of the at least one light guide is to be connected, wherein the at least light port, in use, detects whether or not the at least one light guide is connected to it at a required position. Optionally, the at least one light port is provided on at least one optical instrument which is used to direct the combined beam at the target, using the at least one light guide for such directing. Optionally, when at least one light guide is connected to the at least one light port at the required position, optical leakage at the light port is nil or minimal (i.e., below a given threshold). The technical advantage of this is that the at least one light port ensures that the at least one light guide is properly connected to the at least one optical instrument, thereby resulting in proper transmission of the combined beam towards the target.

Optionally, the optical system further comprises a target illumination optics arranged on the optical path of at least one combined light beam, between the at least one light guide and the target, wherein the at least one combined light beam is focused onto the target by the target illumination optics, and wherein the target illumination optics also performs at least one of: collimation of the at least one combined light beam, beam shaping of the at least one combined light beam, division of the at least one combined light beam. The term "target illumination optics" refers to a set of one or more optical components that enables in directing the combined beam towards the target. When directing the combined beam, the target illumination optics optionally also shapes and/or splits the combined beam in an efficient manner depending upon application of the optical system. As an example, the target illumination optics may be used to shape the combined beam into a shape having a square cross section. As another example, the target illumination optics may be used to split the combined beam into multiple light beams that form light spots or lines on the target. Optionally, the target illumination optics is implemented as at least one of: a mirror, a lens, a prism, a waveguide, a beam shaping element, a collimator, a beam-splitting element, a diffractive optical element (DOE). Examples of the DOE could be a microlens, a zone plate, or the like. The technical benefit of using the target illumination optics in the optical system is that the combined beam is focused to illuminate the target with minimal optical loss, thereby leading to enhanced viewing (and optionally, imaging) of the target.

DETAILED DESCRIPTION OF THE DRAWINGS

Figure 1:
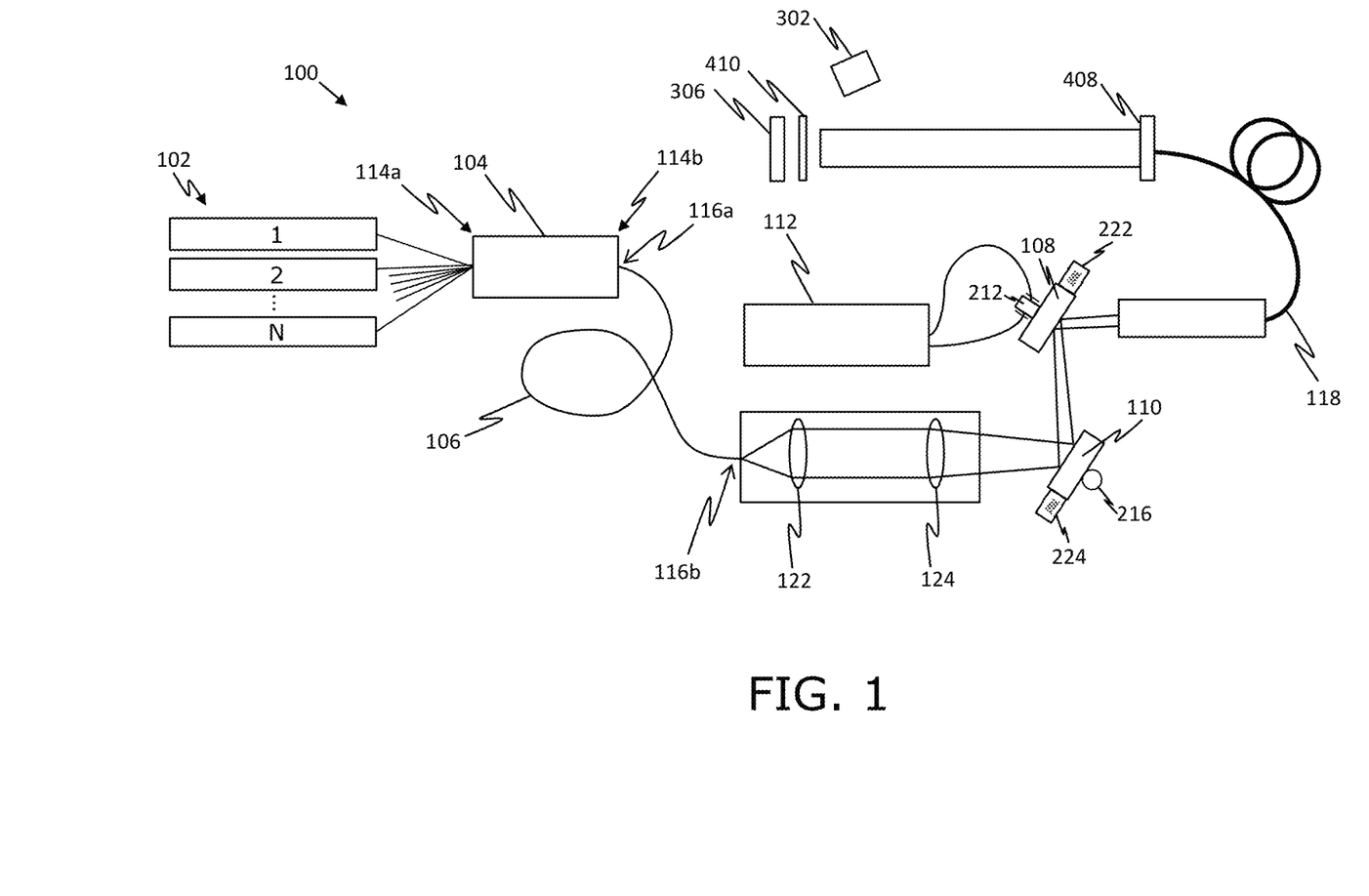
FIG. 1 illustrates a schematic illustration of an optical assembly, in accordance with an embodiment of the present disclosure.

Referring to FIG. 1, illustrated is a schematic illustration of an optical assembly 100, in accordance with an embodiment of the present disclosure. The optical assembly 100 comprises a plurality of light sources 102, at least one fiber combiner (depicted as a fiber combiner 104), at least one optical homogenizer (depicted as an optical homogenizer 106), at least one first optical element (depicted as a first optical element 108), at least one second optical element (depicted as a second optical element 110), at least one first actuator (not shown), and a controller 112. The plurality of light sources 102, in operation, emit a plurality of light beams, the plurality of light beams having a plurality of wavelengths. The fiber combiner 104 is shown to be arranged on an optical path of the plurality of light beams to combine the plurality of light beams into a combined beam. The fiber combiner 104 has a first end 114a and a second end 114b, wherein the plurality of light beams enter the fiber combiner 104 at the first end 114a and the combined beam exits the fiber combiner 104 at the second end 114b. The optical homogenizer 106 produces a homogenous intensity profile of the combined beam, the optical homogenizer 106 having a third end 116a and a fourth end 116b, wherein the combined beam having a non-homogenous intensity profile is received from the fiber combiner 104 at the third end 116a and the combined beam having the homogeneous intensity profile exits the optical homogenizer 106 at the fourth end 116b. The first optical element 108 and the second optical element 110 are arranged on an optical path of the combined beam, between the optical homogenizer 106 and at least one light guide (depicted as a light guide 118), wherein the first optical element 108 and the second optical element 110 collectively steer the combined beam towards the light guide 118. The first actuator is coupled to the first optical element 108. The controller 112 is communicably coupled to the first actuator. The optical assembly 100 further comprises at least one collimator (depicted as a collimator 122) arranged on the optical path of the combined beam between the optical homogenizer 106 and a given optical element. Moreover, the optical assembly 100 further comprises at least one focusing element (depicted as a focusing element 124) arranged on the optical path of the combined beam between the at least one optical homogenizer 106 and the given optical element.

FIG. 1 is merely an example, which should not unduly limit the scope of the claims herein. A person skilled in the art will recognize many variations, alternatives, and modifications of embodiments of the present disclosure.

Figure 2A:
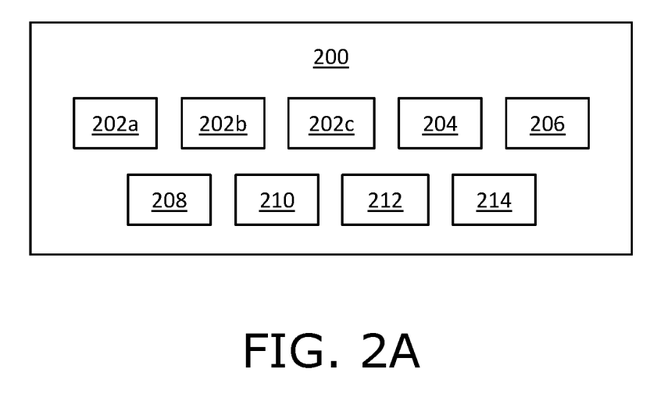
FIGS. 2A and 2B illustrate block diagrams of architectures of an optical assembly, in accordance with different embodiments of the present disclosure.
Figure 2B:
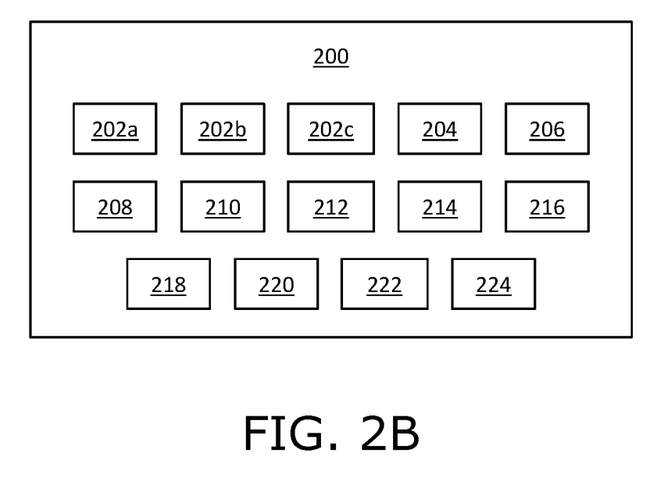

Referring to FIGS. 2A and 2B, illustrated are block diagrams of architectures of an optical assembly 200, in accordance with different embodiments of the present disclosure. The optical assembly 200 comprises a plurality of light sources (depicted as light sources 202a, 202b and 202c), at least one fiber combiner (depicted as a fiber combiner 204), at least one optical homogenizer (depicted as a optical homogenizer 206), at least one first optical element (depicted as a first optical element 208), at least one second optical element (depicted as a second optical element 210), at least one first actuator (depicted as a first actuator 212), and a controller 214.

In FIG. 2B, the optical assembly 200 further comprises at least one second actuator (depicted as a second actuator 216), at least one collimator (depicted as a collimator 218), at least one focusing element (depicted as a focusing element 220), and at least two mounts (depicted as mounts 222 and 224).

It may be understood by a person skilled in the art that the FIGS. 2A and 2B include simplified architectures of the optical assembly 200 for sake of clarity, which should not unduly limit the scope of the claims herein. The person skilled in the art will recognize many variations, alternatives, and modifications of embodiments of the present disclosure.

Figure 3:
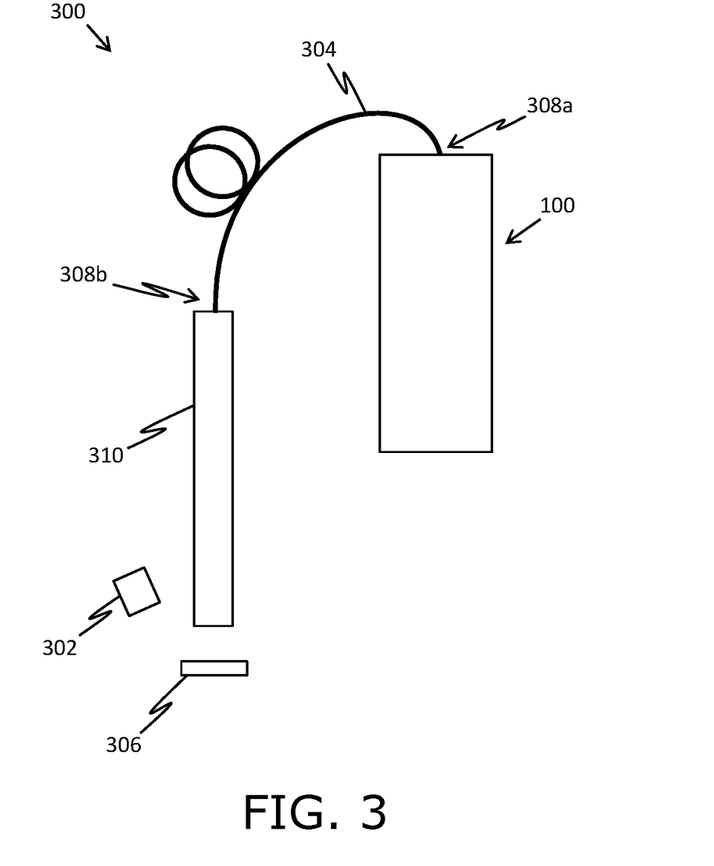
FIG. 3 illustrates a schematic illustration of an optical system, in accordance with an embodiment of the present disclosure.

Referring to FIG. 3, illustrated is a schematic illustration of an optical system 300, in accordance with an embodiment of the present disclosure. The optical system 300 comprises at least one optical assembly (for example, depicted as an optical assembly 100 of FIG. 1), at least one viewing device (depicted as a viewing device 302), and at least one light guide (depicted as a light guide 304). The viewing device 302 is configured to at least view a target 306. The light guide has a fifth end 308a and a sixth end 308b. The optical system 300 further comprises a target illumination optics 310.

FIG. 3 is merely an example, which should not unduly limit the scope of the claims herein. A person skilled in the art will recognize many variations, alternatives, and modifications of embodiments of the present disclosure.

Figure 4A:
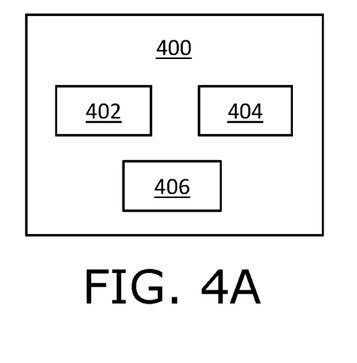
FIGS. 4A and 4B illustrate architectures of an optical system, in accordance with different embodiments of the present disclosure.
Figure 4B:
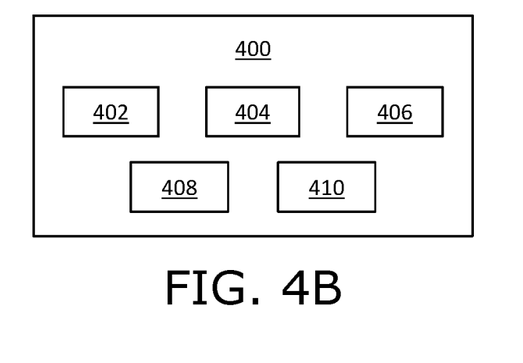

Referring to FIGS. 4A and 4B, illustrated are architectures of an optical system 400, in accordance with different embodiment of the present disclosure. In FIGS. 4A and 4B, the optical system 400 comprises at least one optical assembly (depicted as an optical assembly 402), at least one viewing device (depicted as a viewing device 404), and at least one light guide (depicted as a light guide 406). In FIG. 4B, the optical system 400 further comprises at least one light port (depicted as a light port 408) and a target illumination optics 410.

It may be understood by a person skilled in the art that the FIGS. 4A and 4B include simplified architectures of the optical system 400 for sake of clarity, which should not unduly limit the scope of the claims herein. The person skilled in the art will recognize many variations, alternatives, and modifications of embodiments of the present disclosure.

Figure 5A:
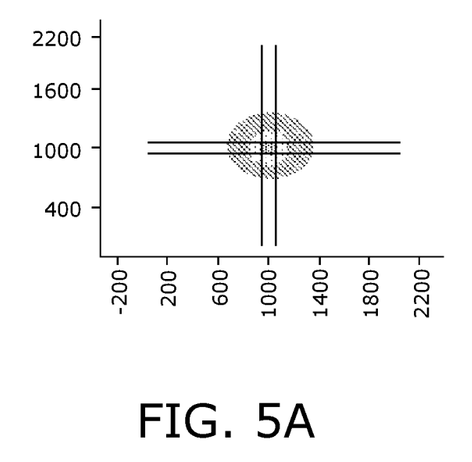
FIG. 5A illustrates a schematic illustration of an output profile of a combined beam generated using an existing optical system.

Referring to FIG. 5A, illustrated is a schematic illustration of an output profile of a combined beam generated using an existing optical system. As shown, the output profile of the combined beam includes granular patterns, and thus has a considerable amount of speckle.

Figure 5B:
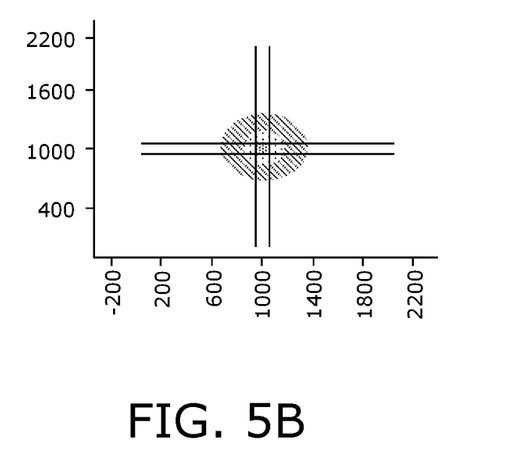
FIG. 5B illustrates a schematic illustration of an output profile of a combined beam generated using an optical system of the present disclosure.

Referring to FIG. 5B, illustrated is a schematic illustration of an output profile of a combined beam generated using an optical system of the present disclosure. As shown, the output profile of the combined beam does not include any granular patterns, and an amount of speckle in the output profile of FIG. 5B is less than the amount of speckle in the output profile of FIG. 5A. In other words, in FIG. 5B, a speckle contrast of the combined beam has been significantly improved as compared to a speckle contrast of the combined beam in FIG. 5A. In FIGS. 5A and 5B, horizontal axes and vertical axes in the illustrations represent arbitrary units (for example, such as pixels).

Figure 6A:
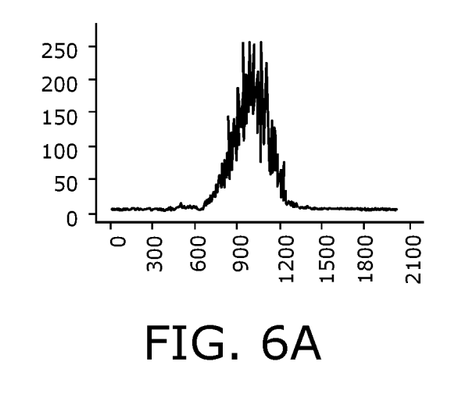
FIG. 6A illustrates a histogram representing an amount of speckle in a combined beam generated using an existing optical system.

Referring to FIG. 6A, illustrated is a histogram representing an amount of speckle in a combined beam generated using an existing optical system. Herein, the amount of speckle is approximately equal to 22.31 percent as the combined beam includes granular patterns, and has a considerable amount of speckle.

Figure 6B:
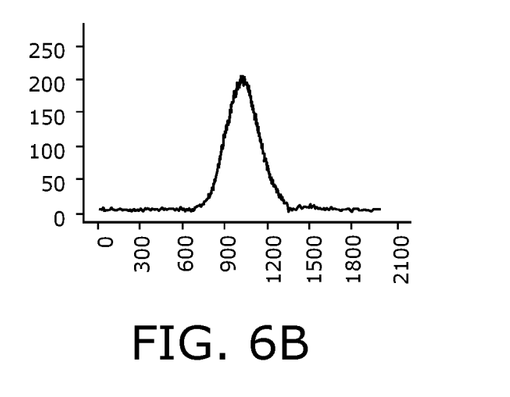
FIG. 6B illustrates a histogram representing an amount of speckle in a combined beam generated using an optical system of the present disclosure.

Referring to FIG. 6B, illustrated is a histogram representing an amount of speckle in a combined beam generated using an optical system of the present disclosure. Herein, the amount of speckle is approximately equal to 4.84 percent as the combined beam does not include any granular patterns, and has a minimal amount of speckle.

FIGS. 5A, 5B, 6A, and 6B are merely examples, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An optical assembly comprising:
a plurality of light sources that, in operation, emit a plurality of light beams, the plurality of light beams having a plurality of wavelengths;
a fiber combiner arranged on an optical path of the plurality of light beams to combine the plurality of light beams into a combined beam, the fiber combiner having a first end and a second end, wherein the plurality of light beams enter the fiber combiner at the first end and the combined beam exits the fiber combiner at the second end;
an optical homogenizer for producing a homogenous intensity profile of the combined beam, the optical homogenizer having a third end and a fourth end, wherein the combined beam having a non-homogenous intensity profile is received from the fiber combiner at the third end and the combined beam having the homogeneous intensity profile exits the optical homogenizer at the fourth end;
a first optical element and a second optical element arranged on an optical path of the combined beam, between the optical homogenizer and a light guide, wherein the first optical element and the second optical element collectively steer the combined beam towards the light guide, and wherein when the optical assembly is in use, the second optical element is adjustable to steer the combined beam;
a first actuator coupled to the first optical element;
a controller communicably coupled to the first actuator, the controller being configured to generate a first signal for controlling the first actuator to adjust the first optical element in a manner that the combined beam is steered by the first optical element whilst also causing vibration of the first optical element at a randomized pattern; and
a second actuator coupled to the second optical element, wherein the controller is communicably coupled to the second actuator, the controller being configured to generate a second signal for controlling the second actuator to adjust the second optical element in a manner that the combined beam is steered by the second optical element.

2. The optical assembly according to claim 1, wherein:
the first optical element is arranged between the second optical element and the light guide; or
a second optical element is arranged between the first optical element and the light guide.

3. The optical assembly according to claim 1, further comprising a collimator arranged on the optical path of the combined beam between the optical homogenizer and a given optical element, wherein the collimator collimates the combined beam.

4. The optical assembly according to claim 1, further comprising a focusing element arranged on the optical path of the combined beam between the optical homogenizer and a given optical element, wherein the focusing element matches a width of the combined beam with a diameter of a fifth end of the light guide, the fifth end being arranged to receive the combined beam.

5. The optical assembly according to claim 1, wherein frequencies in the randomized pattern vary in a range of 100 Hz to 1000 MHz.

6. The optical assembly according to claim 1, wherein the plurality of light sources are implemented as a light source that produces white light and a laser light source that produces fluorescence excitation light, wherein the light source that produces white light is implemented as at least one of: a white light laser, a Red-Green-Blue (RGB) laser, a white light light-emitting diode (LED), a set of RGB LEDs, or a halogen lamp.

7. The optical assembly according to claim 1, wherein the optical homogenizer is implemented as at least one of: a non-circular waveguide, a diffuser, a mirror, a lens, a diffractive element, or an aperture.

8. The optical assembly according to claim 1, wherein the first and second optical elements are implemented as at least one of: a mirror, a lens, or a waveguide.

9. The optical assembly according to claim 1, further comprising at least two mounts to hold the first optical element and the second optical element, wherein the at least two mounts are spring loaded.

10. An optical system comprising:
an optical assembly according to claim 1;
a viewing device configured to at least view a target; and
a light guide having a fifth end and a sixth end, the light guide being arranged on an optical path of a combined light beam exiting the optical assembly and the target, wherein the fifth end receives the combined beam from the optical assembly and the combined beam exits from the sixth end to illuminate the target for enabling at least viewing of the target.

11. The optical system according to claim 10, wherein the light guide is implemented as at least one of: a fiber optic light guide, or a liquid light guide.

12. The optical system according to claim 10, further comprising a light port to which the sixth end of the light guide is to be connected, wherein the light port, in use, detects whether or not the light guide is connected to the light port at a required position.

13. The optical system according to claim 10, further comprising a target illumination optics arranged on the optical path of a combined light beam, between the light guide and the target, wherein the combined light beam is focused onto the target by the target illumination optics, and wherein the target illumination optics also performs at least one of: collimation of the combined light beam, beam shaping of the combined light beam, or division of the combined light beam.

14. The optical system according to claim 10, wherein the target is at least one of: a biomedical sample, or a body part, and wherein the optical system is employed for at least one of: fluorescence microscopy, endoscopy, wide field imaging, advanced optical coherence tomography (OCT), fluorescence molecular tomography (FMT), fluorescence guided surgery, flow cytometry, sequencing, or optical biopsy.

* * * * *